US009356761B2

(12) United States Patent
Gray et al.

(10) Patent No.: US 9,356,761 B2
(45) Date of Patent: May 31, 2016

(54) METHODS, APPARATUSES AND SYSTEMS FACILITATING MANAGEMENT OF AIRSPACE IN WIRELESS COMPUTER NETWORK ENVIRONMENTS

(71) Applicant: Aruba Networks, Inc., Sunnyvale, CA (US)

(72) Inventors: Gordon Paul Gray, Menlo Park, CA (US); Jason Edward Luther, San Francisco, CA (US); Daniel Thomas Augustine, San Francisco, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 92 days.

(21) Appl. No.: 14/051,377

(22) Filed: Oct. 10, 2013

(65) Prior Publication Data
US 2014/0036841 A1    Feb. 6, 2014

Related U.S. Application Data

(63) Continuation of application No. 11/869,624, filed on Oct. 9, 2007, now Pat. No. 8,576,812, which is a continuation of application No. 10/368,152, filed on Feb. 18, 2003, now Pat. No. 7,295,524.

(51) Int. Cl.
| | |
|---|---|
| *H04L 5/00* | (2006.01) |
| *H04L 29/06* | (2006.01) |
| *H04W 12/12* | (2009.01) |
| *H04W 24/08* | (2009.01) |
| *H04W 24/10* | (2009.01) |
| *H04L 12/24* | (2006.01) |

(Continued)

(52) U.S. Cl.
CPC .......... *H04L 5/0058* (2013.01); *H04L 63/1416* (2013.01); *H04W 12/12* (2013.01); *H04W 24/08* (2013.01); *H04W 24/10* (2013.01); *H04L 41/0213* (2013.01); *H04W 8/005* (2013.01); *H04W 88/08* (2013.01)

(58) Field of Classification Search
CPC .. H04W 12/12; H04W 88/08; H04L 63/1416; H04L 63/1441; H04L 63/1433
See application file for complete search history.

(56) References Cited

U.S. PATENT DOCUMENTS

| | | |
|---|---|---|
| 6,047,325 A | 4/2000 | Jain et al. |
| 6,115,376 A | 9/2000 | Sherer et al. |
| 6,347,091 B1 | 2/2002 | Wallentin et al. |

(Continued)

OTHER PUBLICATIONS

U.S. Appl. No. 12/401,553 Office Action mailed Aug. 19, 2011.

(Continued)

*Primary Examiner* — Jung Park
(74) *Attorney, Agent, or Firm* — Mannava & Kang, P.C.

(57) ABSTRACT

According to one embodiment, a particular network device that comprises at least one hardware processor is described. The network device is configured to perform operations including operating in a first mode by communicating wirelessly with at least one wireless client device to provide the at least one wireless client device access to one or more resources, where the operating in the first mode comprises receiving packets transmitted by the at least one wireless client device and forwarding the packets to the one or more resources. Furthermore, the network device performs operations, including switching from operating in the first mode to operating in a monitoring mode and operating in the monitoring mode by decoding data packets addressed to network devices other than the particular network device.

16 Claims, 12 Drawing Sheets

(51) Int. Cl.
*H04W 8/00* (2009.01)
*H04W 88/08* (2009.01)

(56) References Cited

U.S. PATENT DOCUMENTS

| | | |
|---|---|---|
| 6,363,421 B2 | 3/2002 | Barker et al. |
| 6,493,698 B1 | 12/2002 | Beylin |
| 6,567,405 B1 | 5/2003 | Borella et al. |
| 6,674,738 B1 | 1/2004 | Yildiz et al. |
| 6,693,888 B2 | 2/2004 | Cafarelli et al. |
| 6,708,218 B1 | 3/2004 | Ellington, Jr. et al. |
| 6,728,782 B1 | 4/2004 | D'Souza et al. |
| 6,792,395 B2 | 9/2004 | Roberts |
| 6,865,673 B1 | 3/2005 | Nessett et al. |
| 6,917,804 B2 | 7/2005 | Takayama et al. |
| 6,954,790 B2 | 10/2005 | Forslow |
| 6,957,067 B1 | 10/2005 | Iyer et al. |
| 6,965,929 B2 | 11/2005 | Kumar |
| 7,039,027 B2 | 5/2006 | Bridgelall |
| 7,042,852 B2 | 5/2006 | Hrastar |
| 7,068,999 B2 | 6/2006 | Ballai |
| 7,110,762 B1 | 9/2006 | Cameron et al. |
| 7,181,530 B1 | 2/2007 | Halasz et al. |
| 7,203,195 B2 | 4/2007 | Hidaka et al. |
| 7,295,524 B1 | 11/2007 | Gray et al. |
| 7,376,113 B2 | 5/2008 | Taylor et al. |
| 7,969,950 B2 | 6/2011 | Iyer et al. |
| 2001/0056550 A1 | 12/2001 | Lee |
| 2002/0015422 A1 | 2/2002 | Inada et al. |
| 2002/0069278 A1 | 6/2002 | Forslow |
| 2002/0087882 A1 | 7/2002 | Schneier et al. |
| 2002/0099503 A1 | 7/2002 | Mishra et al. |
| 2002/0159418 A1 | 10/2002 | Rudnick et al. |
| 2002/0191548 A1 | 12/2002 | Ylonen et al. |
| 2003/0017826 A1 | 1/2003 | Fishman et al. |
| 2003/0018760 A1 | 1/2003 | Putzolu et al. |
| 2003/0023711 A1 | 1/2003 | Parmar et al. |
| 2003/0031151 A1 | 2/2003 | Sharma et al. |
| 2003/0039234 A1 | 2/2003 | Sharma et al. |
| 2003/0123420 A1 | 7/2003 | Sherlock |
| 2003/0135762 A1 | 7/2003 | Macaulay |
| 2003/0142641 A1 | 7/2003 | Sumner et al. |
| 2003/0196105 A1 | 10/2003 | Fineberg |
| 2003/0219008 A1 | 11/2003 | Hrastar |
| 2003/0221006 A1 | 11/2003 | Kuan et al. |
| 2003/0231649 A1 | 12/2003 | Awoseyi et al. |
| 2004/0003285 A1 | 1/2004 | Whelan et al. |
| 2004/0023640 A1 | 2/2004 | Ballai |
| 2004/0049699 A1 | 3/2004 | Griffith et al. |
| 2004/0068668 A1 | 4/2004 | Lor et al. |
| 2004/0090943 A1 | 5/2004 | da Costa et al. |
| 2004/0137915 A1 | 7/2004 | Diener et al. |
| 2004/0203593 A1 | 10/2004 | Whelan et al. |
| 2004/0209621 A1 | 10/2004 | Teshirogi |
| 2005/0107041 A1 | 5/2005 | Eder |
| 2005/0114649 A1 | 5/2005 | Challener et al. |
| 2005/0281234 A1 | 12/2005 | Kawamura et al. |
| 2005/0285803 A1 | 12/2005 | Iacono et al. |
| 2006/0013188 A1 | 1/2006 | Wiatrowski et al. |
| 2006/0069526 A1 | 3/2006 | Kaiser et al. |
| 2006/0126659 A1 | 6/2006 | Baum et al. |
| 2007/0053362 A1 | 3/2007 | Garg |
| 2007/0078974 A1 | 4/2007 | Krishnan |
| 2007/0160003 A1 | 7/2007 | Meier |
| 2007/0230361 A1 | 10/2007 | Choudhury |
| 2007/0294747 A1 | 12/2007 | Rosenberger |
| 2007/0298720 A1 | 12/2007 | Wolman et al. |
| 2008/0080420 A1 | 4/2008 | Iyer et al. |
| 2008/0175166 A1 | 7/2008 | Oerton |
| 2008/0181184 A1 | 7/2008 | Kezys |
| 2008/0253327 A1 | 10/2008 | Kohvakka et al. |
| 2009/0013073 A1 | 1/2009 | Chaskar et al. |
| 2009/0016529 A1 | 1/2009 | Gopinath et al. |
| 2009/0028118 A1 | 1/2009 | Gray et al. |
| 2009/0235354 A1 | 9/2009 | Gray et al. |
| 2009/0271864 A1 | 10/2009 | Dietrich et al. |

OTHER PUBLICATIONS

U.S. Appl. No. 10/368,152 Office Action mailed Jun. 15, 2007.
U.S. Appl. No. 10/368,152 Office Action mailed Jan. 18, 2007.
U.S. Appl. No. 11/542,327 Office Action mailed Nov. 24, 2010.
U.S. Appl. No. 11/542,327 Office Action mailed Jun. 29, 2010.
J. Case et al., "RFC 1157—A Simple Network Management Protocol (SNMP)", 1990, pp. cover.
Beyah et al. "Rogue Access Point Detection using Temporal Traffic Characteristics", 2004, IEEE Communications Society, Globecom 2004, 0-7803-8794-5/04. p. 2272.
U.S. Appl. No. 11/542,327 Office Action mailed Nov. 12, 2008.
U.S. Appl. No. 11/542,327 Office Action mailed Jan. 6, 2010.
U.S. Appl. No. 11/542,327 Office Action mailed May 28, 2009.
U.S. Appl. No. 11/542,327 Office Action mailed Jun. 28, 2011.
U.S. Appl. No. 12/401,553, Non-Final Office Action, mailed Aug. 21, 2013.
Mogul et al., Internet Standard Subnetting Procedure, Aug. 1985, Network Working Group, RFC 950, p. 7.
U.S. Appl. No. 12/401,553, Office Action, mailed Jan. 12, 2012.
U.S. Appl. No. 12/401,553, Office Action, mailed Jun. 15, 2012.
U.S. Appl. No. 11/869,624, Non Final Office Action, mailed May 14, 2013.
U.S. Appl. No. 11/869,624, Non Final Office Action, mailed Apr. 4, 2012.
U.S. Appl. No. 11/869,624, Non Final Office Action, mailed Nov. 29, 2011.
U.S. Appl. No. 11/869,624, Non Final Office Action, mailed Mar. 2, 2011.
U.S. Appl. No. 11/869,624, Final Office Action, mailed Sep. 13, 2012.
U.S. Appl. No. 11/869,624, Final Office Action, mailed Jul. 19, 2011.
Engwer, Darwin, ""WDS" Clarifications", IEEE P802.11 Wireless LANs, Jul. 2005, pp. 1-9.
Ergen, Mustafa, "IEEE 802.11 Tutorial", Department of Electrical Engineering and Computer Science University of California, Berkeley, Jun. 2002, pp. 1-93.

FIG. 2

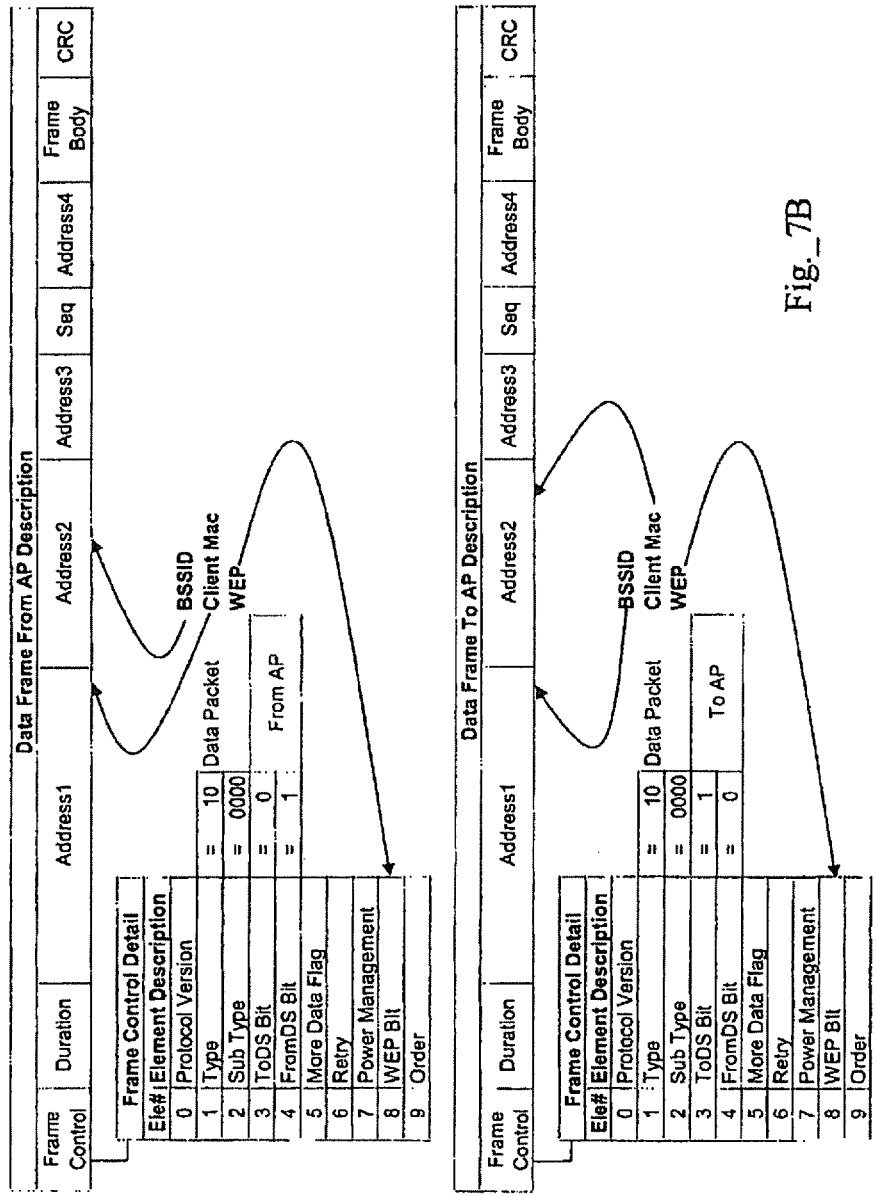
Fig._7B

| AP MEMORY BUFFER DURING ROGUE AP SCAN ||||||||
|---|---|---|---|---|---|---|---|
| SCANNING CHANNEL | PACKET TYPE | BSSID | CLIENT MAC | SSID | WEP | TYPE | CHANNEL | RSSI |
| 1 | DATA | 00:02:2D:03:4C:B0 | 00:02:2D:56:5B:FF | | NO | CLIENT | 1 | |
| 2 | DATA | 00:02:2D:03:4C:B0 | 00:02:2D:56:5B:FF | | NO | CLIENT | 2 | |
| 3 | BEACON | 00:02:2D:03:4C:B0 | | AirPort NETWORK | NO | AP | 1 | 30 |
| 3 | DATA | 00:02:2D:03:4C:B0 | 00:02:2D:56:5B:FF | | NO | CLIENT | 3 | |
| 4 | BEACON | 00:02:2D:03:4C:B0 | | AirPort NETWORK | NO | AP | 1 | 26 |
| 5 | DATA | 00:03:2F:00:12:AE | 00:06:25:0D:6E:16 | | NO | CLIENT | 5 | |
| 6 | DATA | 00:03:2F:00:12:AE | 00:06:25:0D:6E:16 | | NO | CLIENT | 6 | |
| 7 | DATA | 00:03:2F:00:12:AE | 00:06:25:0D:6E:16 | | NO | CLIENT | 7 | |
| 8 | NO DATA | | | | | | | |
| 9 | DATA | 00:02:2D:0D:4D:7C | 00:06:25:0D:AA:11 | | NO | CLIENT | 9 | |
| 10 | DATA | 00:02:2D:0D:4D:7C | 00:06:25:0D:AA:11 | | NO | CLIENT | 10 | |
| 11 | DATA | 00:02:2D:0D:4D:7C | 00:06:25:0D:AA:11 | | NO | CLIENT | 11 | |

| POST ANALYSIS DATA SENT VIA SNMP TRAPS TO AMP FROM SCANNING AP ||||||||
|---|---|---|---|---|---|---|---|
| awAPScanID | awAPReturnBSSID | awAPReturnSSID | awAPReturnChannel | awAPReturnWepOn | awAPReturnType | awAPReturnRSSI | awAPReturnCLMAC |
| 00:03:2F:00:79:FE | 00:02:2D:03:4C:B0 | AirPort NETWORK | 1 | 1 | 1 | 28 | |
| 00:03:2F:00:79:FE | 00:02:2D:03:4C:B0 | AirPort NETWORK | | | 2 | | 00:02:2D:56:5B:FF |
| 00:03:2F:00:79:FE | 00:03:2F:00:12:AE | | 6 | | 2 | | 00:06:25:0D:6E:16 |
| 00:03:2F:00:79:FE | 00:02:2D:0D:4D:7C | | 11 | | 2 | | 00:06:25:0D:AA:11 |

| Name | Radio MAC | LAN MAC | IP Address | Type | SSID | Ch | WEP | RSSI | Time | Discovering Agent |
|---|---|---|---|---|---|---|---|---|---|---|
| Unknown | 00:04:5A:28:08:74 | | | LinkSys | Public | 11 | no | 31 | 2/9/2003 8:00 AM | Northern Scanner |
| Unknown | 00:05:5D:25:08:8E | | | D-Link | D-Link | 7 | no | 31 | 2/9/2003 8:00 AM | Northern Scanner |
| Unknown | 00:50:8B:99:08:66 | | | Compaq | Any | 6 | no | 31 | 2/9/2003 8:00 AM | Northern Scanner |
| Unknown | 00:06:25:24:06:1C | | | LinkSys | Public | 6 | no | 31 | 2/9/2003 8:00 AM | Northern Scanner |
| Unknown | 00:30:AB:16:22:4B | | | Delta Ntwks | Paul | 6 | yes | 31 | 2/9/2003 7:59 AM | Northern Scanner |

FIG. 11

□ AirWave Demo AMP - Microsoft Internet Explorer

File Edit View Favorite Tools Help

Back | Search | Favorites | Media | ▷ | Go | Links

Address http://demo

★New Devices: 3  ↑Up: 3  ↓Down: 1  ×Rogue: 5  ○Users: 0  !Alerts: 25

Home | Groups | APs | Down | Users | Reports | System | Setup

All | New | UP | Down | Rogue | Ignored | Create

Type: LinkSys  Names:
Radio MAC: 00:04:5A:28:08:74
SSID: Public  Notes:
Channel: 11
WEP: No
First Discovered: 02/01/2003 09:15 PM  [Update]

Latitude:
Longitude:

Scanning Agent Details

Rogue Device Details

| SSID | Ch | WEP | RSSI | Discovered | Agent Name | Ch | SSID | Longitude | Latitude |
|---|---|---|---|---|---|---|---|---|---|
| Public | 11 | No | 50 | 02/09/2003 8:00 AM | Northern Scanner | 6 | Sales | 37.458520 | -122.158650 |
| Public | 11 | No | 78 | 02/01/2003 9:15 AM | Accounting | 1 | Accounting | 37.458454 | -122.158601 |

Done

METHODS, APPARATUSES AND SYSTEMS FACILITATING MANAGEMENT OF AIRSPACE IN WIRELESS COMPUTER NETWORK ENVIRONMENTS

CROSS-REFERENCE TO RELATED APPLICATION

This application is a Continuation of U.S. patent application Ser. No. 11/869,624, filed on Oct. 9, 2007, now U.S. Pat. No. 8,576,812, which is a Continuation of U.S. patent application Ser. No. 10/368,152, filed on Feb. 18, 2003, now U.S. Pat. No. 7,295,524, the entire disclosures of which are incorporated herein by reference.

FIELD OF THE INVENTION

The present invention relates to wireless computer networks and, more particularly, to methods, apparatuses and systems facilitating monitoring and management tasks associated with wireless computer networks including wireless access points and wireless clients.

BACKGROUND OF THE INVENTION

In 1997, the Institute of Electrical and Electronics Engineers (IEEE) approved 802.11 the first internationally sanctioned wireless LAN (WLAN) standard. The IEEE 802.11 standard establishes specifications for the parameters of both the physical (PHY) and media access control (MAC) layers of the network. The Institute of Electrical and Electronics Engineers (IEEE) ratified the original 802.11 standards as the standard for WLANs. The initial standard provided 1 Mbps and 2 Mbps transmission rates. This rate of transmission was not sufficient for most general business applications and consequently the rate of adoption was slow.

Recognizing the need for faster transmission speeds, the IEEE ratified the 802.11b standard to allow for transmission speeds of up to 11 Mbps. This new standard now aligns wireless connectivity on comparable levels to wired Ethernet LANs. The range for WLANs depends largely on the medium by which the radio waves are transmitted and the strength of the transmitting antenna. Open air ranges are much longer than if several walls come between the antennas. Depending on the type of radio antenna (omni-directional, bi-directional, etc.) and transmitter strength, optimal distances can vary from 200 feet to 10 miles. Fallback speeds of 5.5, 2, and 1 Mbps occur when optimal distances for transmission are exceeded.

The first 802.11 standard proposed three implementations for the Physical Layer (PHY): Infrared (IR) Pulses Position Modulation, RF Signaling using Frequency Hopping Spread Spectrum (FHSS), and Direct Sequence Spread Spectrum (DSSS). Two working groups were established to explore alternate implementations of the 802.11 standard. Working Group A explored the 5.0 GHz band, while Working Group B focused on the 2.4 GHz band. Wireless communications take place within an area known as the Basic Service Area defined by the propagation characteristics of the wireless medium. A wireless node communicates via a Basic Service Set (BSS) within a basic service area. There are two basic service sets independent and Infrastructure. The independent service set allows wireless stations to operate in a peer-to-peer or Ad Hoc mode. In the ad-hoc network, computers are brought together to form a network "on the fly." There is no structure to the network; there are no fixed points; and usually every node is able to communicate with every other node. Although it seems that order would be difficult to maintain in this type of network, algorithms such as the spokesman election algorithm (SEA) have been designed to select one wireless node as the base station (master) of the network with the others being slaves. The infrastructure service set is the more common approach involving access points (APs) that allow for and control access to the wireless network. An access point usually contains a transceiver, a wired network interface (e.g., 802.3) and software for data processing. If service areas of access points overlap, handoffs of wireless clients between access points can occur.

Wireless local area networks (WLANs), need their air space to be consistently mapped in order to maintain optimum speed and reliability. In an Ethernet LAN (IEEE 802.3), the Carrier Sense Multiple Access with Collision Detection (CSMA/CD) protocol establishes how simultaneous transmissions (packet collisions) are handled. In a WLAN, collision detection in this manner is not possible due to what is known as the "near/far" problem: to detect a collision, a station must be able to transmit and listen at the same time. To account for this difference, the 802.11 protocol uses a slightly different protocol known as Carrier Sense Multiple Access with Collision Avoidance (CSMA/CA) or the Distributed Coordination Function (DCF). CSMA/CA attempts to avoid packet collisions by using explicit packet acknowledgement (ACK), which means that an ACK packet is sent by the receiving station to confirm that a packet arrived intact. CSMA/CA works by having the transmitting wireless station sense the air. If there is no activity detected, the transmitting wireless station will wait an additional random period of time. If there still is no activity, the wireless station transmits the data. If the packet is received intact, the receiving station will send and ACK frame that, once received by the original sender, completes the transmission. If the ACK command is not received in a specified random period of time, the data packet will be resent, assuming that the original packet experienced a collision CSMA/CA will also handle other interference and radio-wave related problems effectively, but creates considerable overhead.

Given the collision avoidance mechanisms employed in 802.11-compliant wireless networks, management and monitoring of the wireless network airspace (for example, to ensure that wireless access points do not interfere with one another) is critical to the performance of the wireless network environment. The administrative or management functionality associated with WLAN networks, however, generally lacks a reliable and accurate means of collecting, storing, and relating airspace data. Hand-held scanners, AP startup scans, or full-time scanning devices are the current methods of obtaining WLAN air space data. However, these methods are inherently flawed or not cost effective. Accordingly, most WLANs do not perform at optimum speed due to overlapping channel interference and rogue access points (i.e., access points installed without authorization and/or knowledge of a network administrator).

In light of the foregoing, a need in the art exists for methods, apparatuses and systems that allow for efficient mapping of the air space associated with wireless networks. A need further exists for methods, apparatuses and systems that facilitate detection of rogue or unauthorized wireless access points. Embodiments of the present invention substantially fulfill these needs.

SUMMARY OF THE INVENTION

The present invention provides methods, apparatuses and systems facilitating the management of wireless computer network environments and the detection of rogue and other devices that may affect the performance and/or security of the wireless computer network. The present invention enables accurate and cost effective WLAN air space mapping. In one embodiment, the present invention allows any conforming access point the ability to routinely scan its airspace, collect data on all operating frequencies and report this information back to a management platform. In one embodiment, the management and reporting functionality described herein uses a standards-based vehicle, such as Simple Network Management Protocol (SNMP). In one embodiment, the present invention allows for detection of all wireless traffic within or affecting an enterprise's computer network environment, picking up all active access points (Ad Hoc or Infrastructure) and all wireless clients data regardless of SSID, channel, or security settings. The management platform, according to an embodiment of the present invention, analyzes information received from the access points under management to detect and report the state of the computer network environment. In one embodiment, the present invention facilitates isolation of rogue wireless devices affecting the computer network environment and effective decision-making as to management of the detected device. The present invention also allows network administrators to optimize the configuration of the wireless network environment for performance and security.

DESCRIPTION OF THE DRAWINGS

FIG. 2 shows a user interface providing a detailed list of managed wireless access points.

FIG. 7B provides the layout of data frames or packets in 802.11 networks.

FIG. 8 illustrates a memory buffer constructed during a scan for rogue devices and a table illustrating the elements of SNMP traps summarizing the data in the memory buffer.

FIG. 10 provides a user interface showing a list of detected rogue access points.

FIG. 11 illustrates a user interface showing a detail view of a given rogue access point detected during a scan.

DESCRIPTION OF PREFERRED
EMBODIMENT(S)

I. Computer Network Environment

Figure 1:
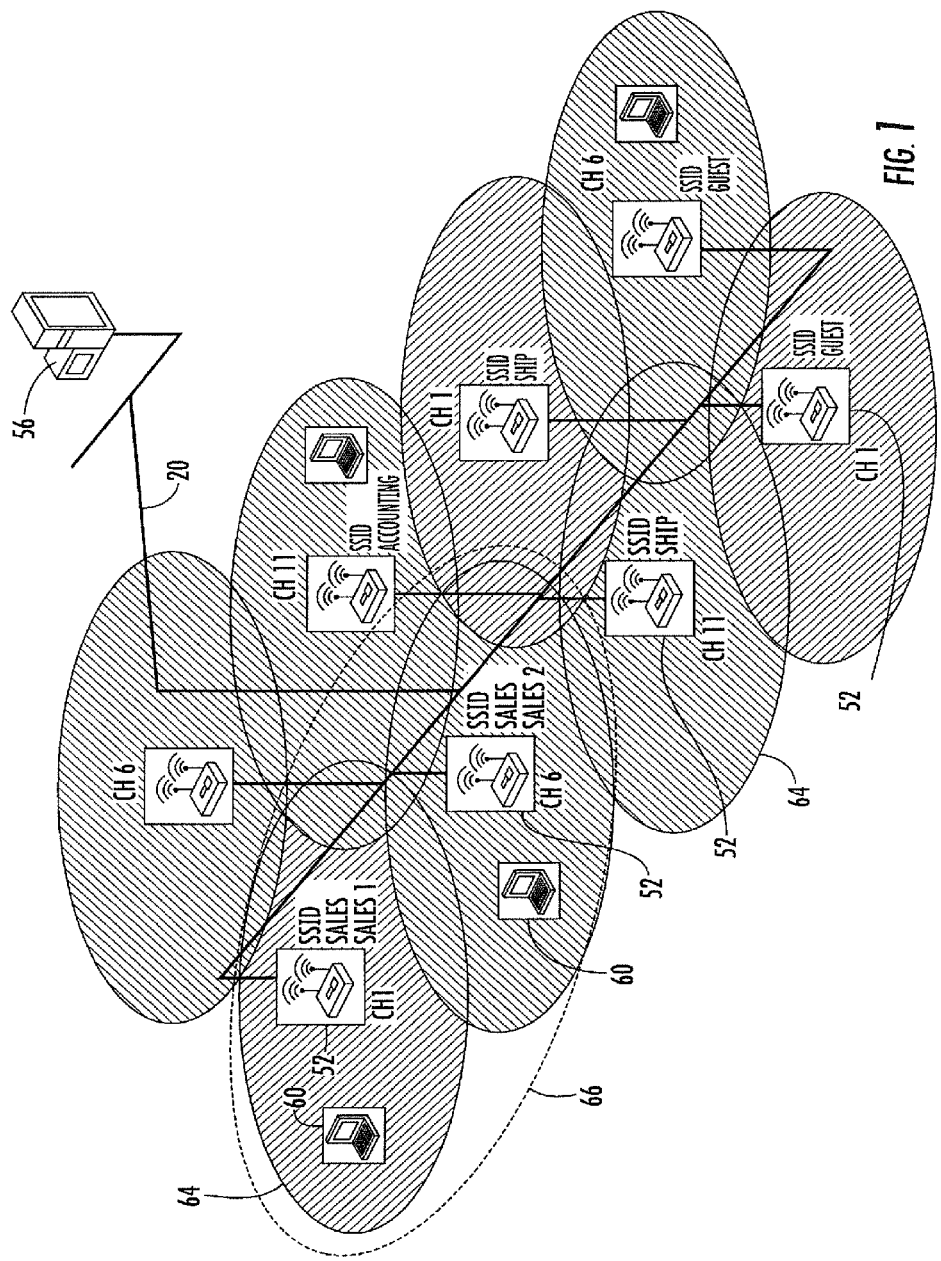
FIG. 1 is a functional block diagram illustrating a wireless computer network environment according to an embodiment of the present invention.

FIG. 1 illustrates a computer network environment including an embodiment of the present invention. As FIG. 1 illustrates, the present invention, in one embodiment, operates in a computer network environment including a local area network (LAN) 20 interconnecting a plurality of hosts or other end systems, such as servers, network computers, etc., airspace management platform 56, and at least one wireless access point 52. Other computer network environments are possible. For example, while FIG. 1 illustrates that airspace management platform 56 and the at least one wireless access point 52 are connected via a LAN 20, embodiments of the present invention can be deployed across a wide area network, such as the Internet, to allow a network administrator to remotely manage one to a plurality of network access points 52 from distant locations.

Wireless access points 52 can act as a hub to route data between wireless client devices 60 within its coverage area, and/or bridge network traffic between a computer network 20 and one or more wireless client devices 60. A Basis Service Set (BSS) 64 refers to the wireless network implemented by a given wireless access point 52 that manages and bridges wireless communications for all wireless client devices 60 within its operating range (Basic Service Area (BSA) and operating on the same frequency channel (see FIG. 1). In 802.11-compliant wireless networks, a Service Set Identifier (SSID), a unique, 32-character identifier attached to the header of data packets transmitted over a WLAN, acts as a form of password or token when wireless client devices 60 attempt to connect to a Basic Service Set. The SSID differentiates one WLAN from another in that all wireless client devices 60 attempting to connect to a specific WLAN must use the same SSID. An Extended Service Set (ESS) 66 refers to two or more Basic Service Sets, having the same SSID, that are interconnected by a Distribution System (DS) (such as an Ethernet LAN 20), which provides a set of services enabling the transport of data between BSSs.

Wireless access point 52 is operative to dynamically recognize new users/wireless client devices 60 and wirelessly communicate with one to a plurality of wireless client devices 60. Wireless access point 52 includes a radio frequency transmitter/receiver unit or an infrared transmitter receiver unit, or both. However, any suitable means of wireless communication can be used. Wireless access point 52 can operate in connection with any wireless communications protocol, including 802.11a and 802.11b, as well as Bluetooth. Wireless access point 52 is further operative to allow access to resources operably connected to computer network 20. In one embodiment, wireless access point 52 is operative to convert all wireless traffic to Ethernet (or other LAN or network protocol) and route it to appropriate systems connected to computer network 20. Of course, the specific or optimal network protocols used in connection with the present invention may vary with the protocols implemented on LAN 20. In one embodiment, wireless access point 52 routes all wireless traffic from client devices 60 to a single location in the computer network embodiment (in one embodiment, a secure access server that authenticates users at client devices and controls access to resources connected to computer network 20). Co-pending and commonly owned U.S. application Ser. No. 10/271,106 filed Oct. 15, 2002 and entitled "Secure Wireless Network Access Points," (incorporated by reference herein), discloses methods and systems directed to securing wireless network access points. In one embodiment, wireless access point 52 includes tunneling functionality establishing and maintaining a virtual communications tunnel between access point 52 and the secure access server as disclosed in U.S. application Ser. No. 10/271,106, above. However, as one skilled in the art will recognize, the present invention can be applied in connection with a variety of secure and non-secure wireless network access point configurations. In one embodiment, at least one wireless network access point 52 includes scanning agent functionality operative to monitor its surrounding airspace for wireless traffic relative to at least one frequency channel, gather data characterizing detected wireless traffic, and transmit the data to airspace management platform 56 for processing and presentation to a network administrator. In WLAN environments employing 802.11 protocols, the wireless access point(s) 52 are equipped with 802.11-compliant WLAN network interface cards which support Radio Frequency (RF) monitoring mode, as well as the proper device drivers. In one embodiment, the wireless access point 52 includes an SNMP Management Information Base (MIB) for standards-based delivery of the scan data from the access point to the airspace management platform. In one embodiment, the scanning agent is a software daemon that is invoked when an SNMP SET request is received; the scanning agent operates to scan its airspace and transmit SNMP traps characterizing the devices detected within its coverage area and then allows the wireless access point 52 to resume normal operation.

As discussed in more detail below, airspace management platform 56 facilitates management and overview of the wireless access point(s) 52 operably connected to computer network 20 and, in connection with one or more suitable wireless access point(s) 52, is operative to monitor the wireless network airspace associated with an administrative domain for wireless client devices and/or network access points, including known/authorized and/or rogue devices and access points. As discussed in more detail below, airspace management platform 56, in one embodiment, allows network administrators to schedule wireless access point (s) 52 to perform regular or intermittent scans, as well as start scans on-demand. Airspace management platform 56 is further operative to receive data from the network access point(s) 52, interpret the received data, and present it in a variety of interfaces to a network administrator to allow for intelligent, well-informed decision-making as to the computer network domain. In one embodiment, airspace management platform 56 is a Web-based application executed on a server or other computing device operably connected to computer network 20, and accessible via a client computer including suitable browsing software, such as Microsoft® Internet Explorer®, or Netscape® Navigator browsers. In another embodiment, airspace management platform 56 may reside on a desktop computer associated with a network administrator.

II. Operation

A. Registration and Management of Access Points

Using the airspace management platform 56, a network administrator registers at least one wireless access point 52 by entering or discovering information unique to the access point, such as BSSID or Wireless MAC address, LAN MAC address, and LAN IP address. As discussed below, BSSID or Wireless MAC address, LAN MAC address, and IP address are used as indexes in tables or other data structures that store information about each access point. Wireless access point(s) 52 that are registered with the airspace management platform 56 can then be used to scan for rogue access points and client devices, as discussed below. After registration, access points are authorized or brought under management of airspace management platform 56. The airspace management platform 56 can monitor the registered wireless access point(s) over computer network 20 via Simple Network Management Protocol (SNMP) read community string, and configure the wireless access point(s) 52 via SNMP read-write community string.

In one embodiment, airspace management platform 56 discovers the functionality and other parameters associated with registered wireless access points and populates a database (such as the tables, below) that includes information on each registered wireless access point 52. Airspace management platform 56, in one embodiment, supports a variety of Layer 2 discovery protocols such as CDP (Cisco Discovery Protocol), CDP (Cabletron Discovery Protocol, OSUNMS, and WNMS. Layer 2 discovery methods are suitable when airspace management platform 56 is on the same physical network as the access points 52. Higher layer discovery methods, such as SNMP and HTTP subnet scanning, are valuable for discovering wireless access points 52 on networks in which airspace management platform 56 is not physically located.

A.1. Access Point Master Table

As discussed above, airspace management platform 56 maintains a database storing information relating to the wireless access point(s) within the airspace associated with the computer network domain. In one embodiment, the database is a relational database comprising a plurality of tables, including a Master_AP table, an AP_Capabilities table, as well as other tables set forth below. In one embodiment, airspace management platform 56 creates a record in an AP_Master table including information gathered during the registration and discovery processes. The AP_Master table, in one embodiment, includes the following fields: 1) AP_Name (a user definable field of 32 characters), 2) Wireless Interface MAC address (Media Access Control, a 48-bit address generally displayed as 12 hexadecimal digits), 3) LAN Interface MAC Address, 4) LAN IP, 5) Service Set Identifier, 6) Type (i.e., Manufacturer and Product Name), 7) Firmware Version, 8) Channel, 9) Uptime, 10) Positional Parameters (e.g., Latitude and Longitude), and 11) a RogueScanFlag (indicating whether the wireless access point supports rogue access point scanning). Other fields can include: 12) Group Name (a user definable field indicating a grouping of access points for administrative purposes, see below), 13) status [up/down], 14) number of users, and 15) bandwidth.

The AP_Master table has several indexes which are employed in rogue access point detection. In one embodiment, the primary keys for the AP_Master table are: AP_Name, LAN Interface MAC Address (LAN_MAC), and Wireless Interface MAC Address (WLAN_MAC). Another field of importance to rogue access point detection in the AP_Master table is the RogueScanFlag. This flag is a Yes/No data type, where "Yes" indicates that the access point supports rogue AP scanning, and "No" indicates that the access point does not support rogue AP scanning. As discussed above, the database maintained by airspace management platform 56 contains an AP_Capabilities table relating AP manufacturer, model, and ability to support rogue scanning. When access points are registered and inserted into the AP_Master table the AP_Capabilities table is queried by manufacturer and model name to correctly set the RogueScanFlag in the AP_Master table.

Figure 2:
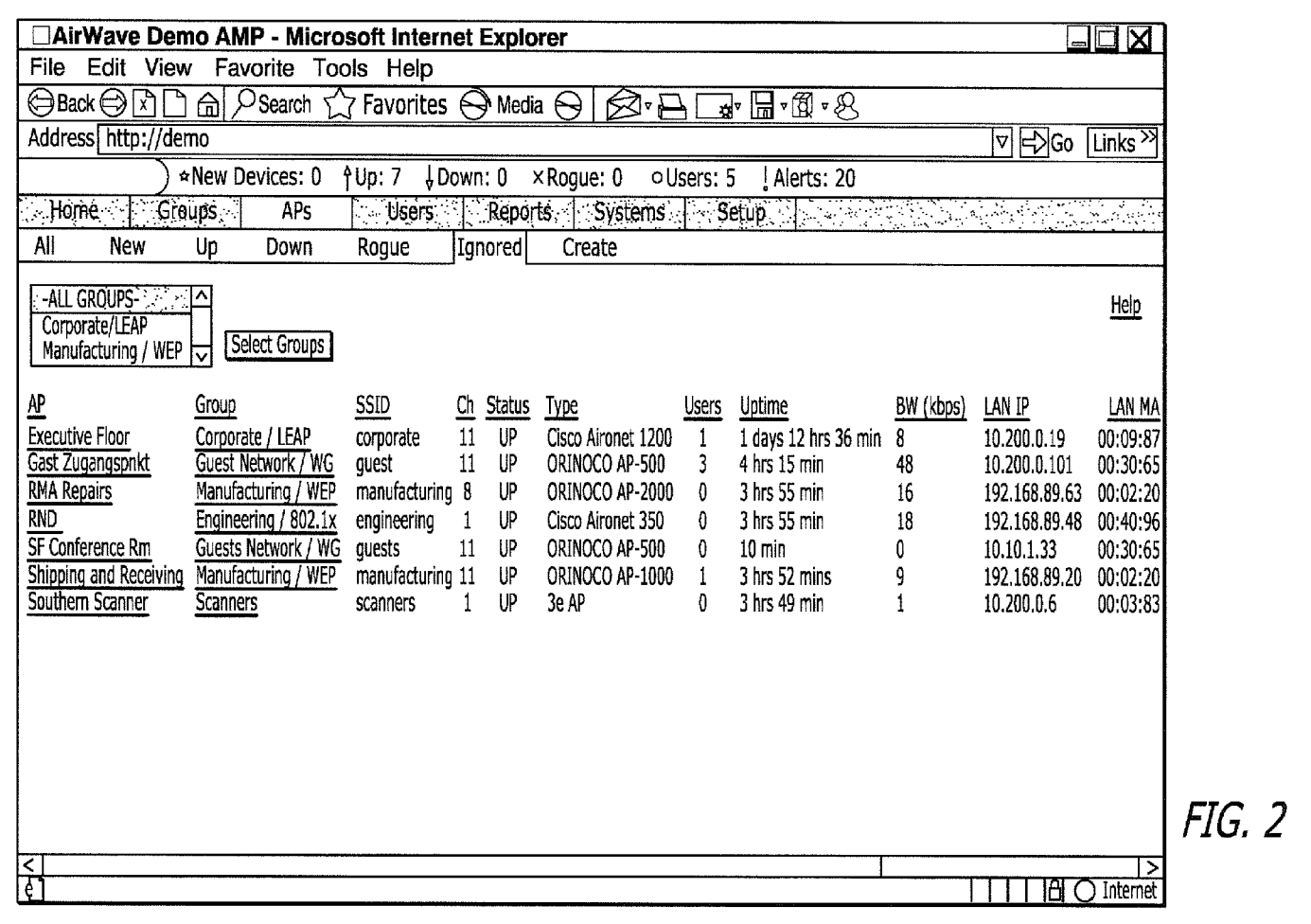
Figure 3:
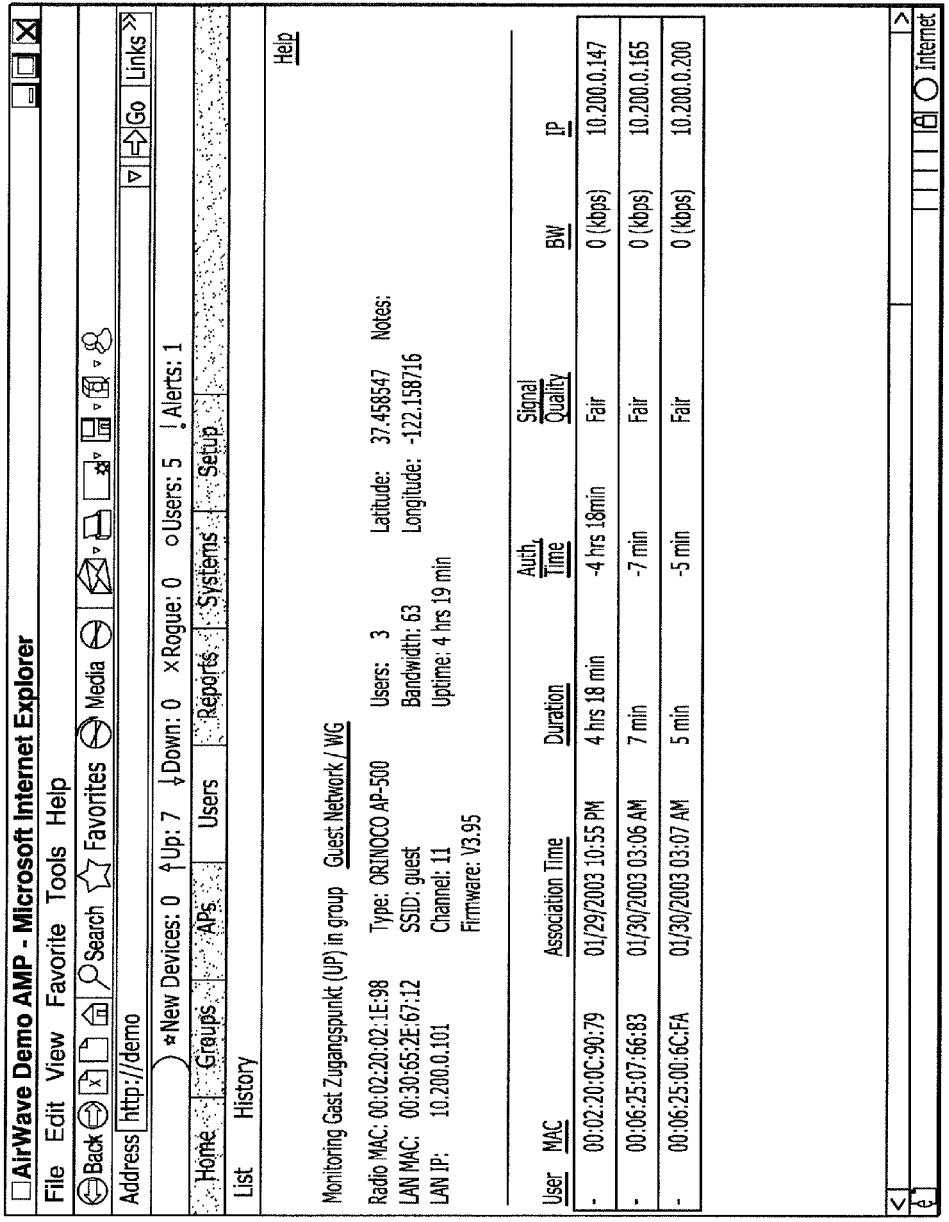
FIG. 3 sets forth a user interface providing detailed information associated with a given wireless access point.

As FIG. 2 illustrates, airspace management platform 56 provides an overview of the wireless access points, displaying, in one embodiment, a subset of the values or fields of the APMaster table to the network administrator. As FIG. 3 shows, airspace management platform 56 also allows the user to click on a particular access point in the interface depicted in FIG. 2 to see a detailed view of a desired wireless access point, such as the users currently associated with a wireless access point 52.

A.2. Administrative Groups

Figure 4:
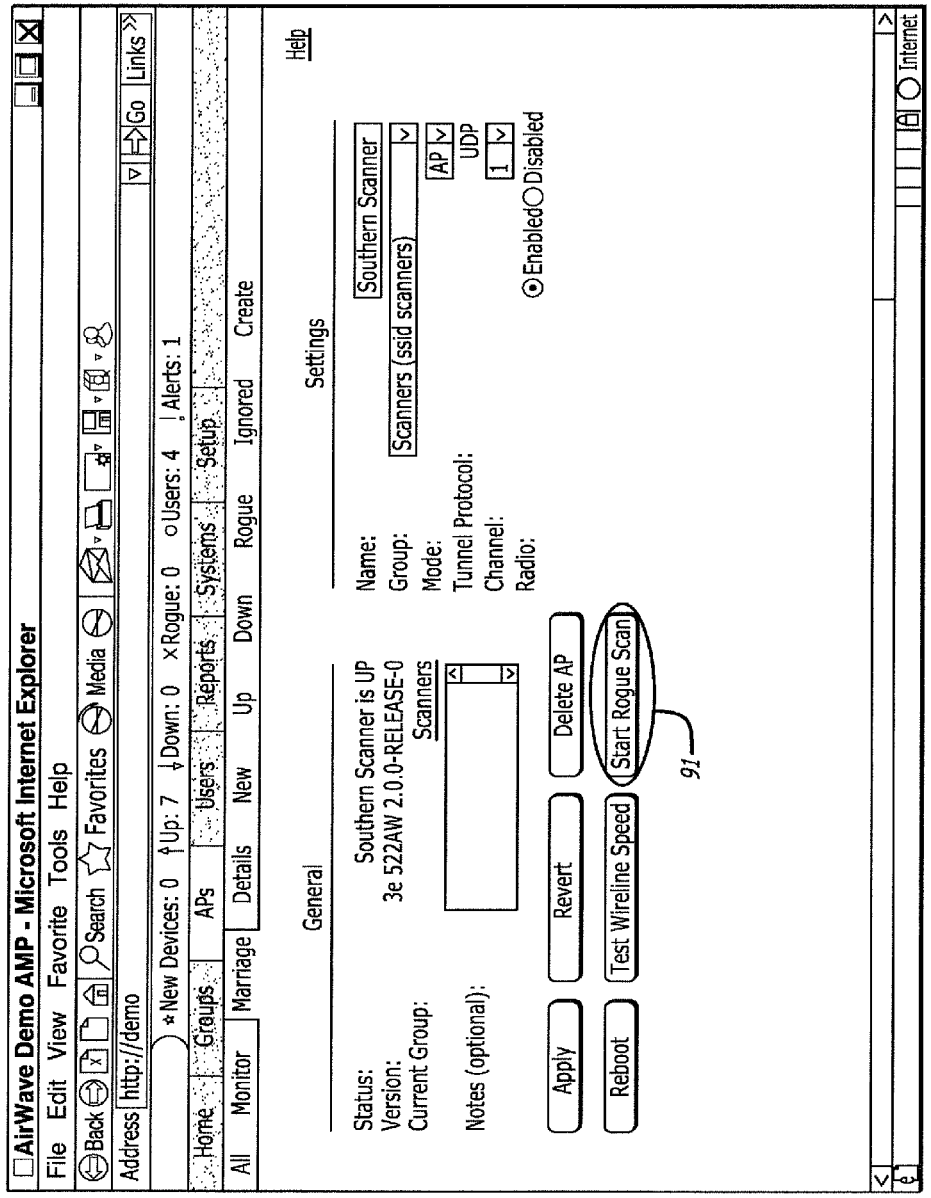
FIG. 4 provides a user interface that allows a user to initiate a scan at a given access point for rogue devices operating within its airspace.

Once registered, wireless access point(s) 52 are ready for inclusion in scans for rogue access points. As discussed above, airspace management platform 56 allows a network administrator to define two or more managed wireless access point(s) into groups for administrative purposes, such as applying configuration changes and the scheduling of rogue access point scans. Airspace management platform 56 allows a network administrator to initiate a scan at the access point level (see FIG. 4, button 91), or at the group level (see FIG. 5). In one embodiment, a "group" encompasses access points sharing similar security and radio characteristics. For example, in the WLAN set forth in FIG. 1, wireless access points named "Sales1" and "Sales2" are associated with a group defined by a network administrator. These wireless access points share the same SSID and security settings geared for the Sales department or "Sales Group" as defined in airspace management platform 56. Accordingly, in this example, the employees or other users associated with the sales department would configure their wireless client devices (WLAN network interface cards) to associate with access points having an SSID set to "Sales." In another embodiment, a group is arbitrarily defined by an administrator according to any desired criteria, such as location, department, etc. Groups can be used to simplify administration of a wireless LAN functionality, because configuration changes for a group can be entered once and automatically applied to all wireless access points associated with the group. In addition, groups provide a very efficient way of viewing or monitoring the wireless network. Executing a rogue AP scan by group enables a WLAN administrator to trigger scanning on all wireless access points in the) group that have scanning capability with minimal effort.

A.3. Scheduling of AP Scans

Figure 5:
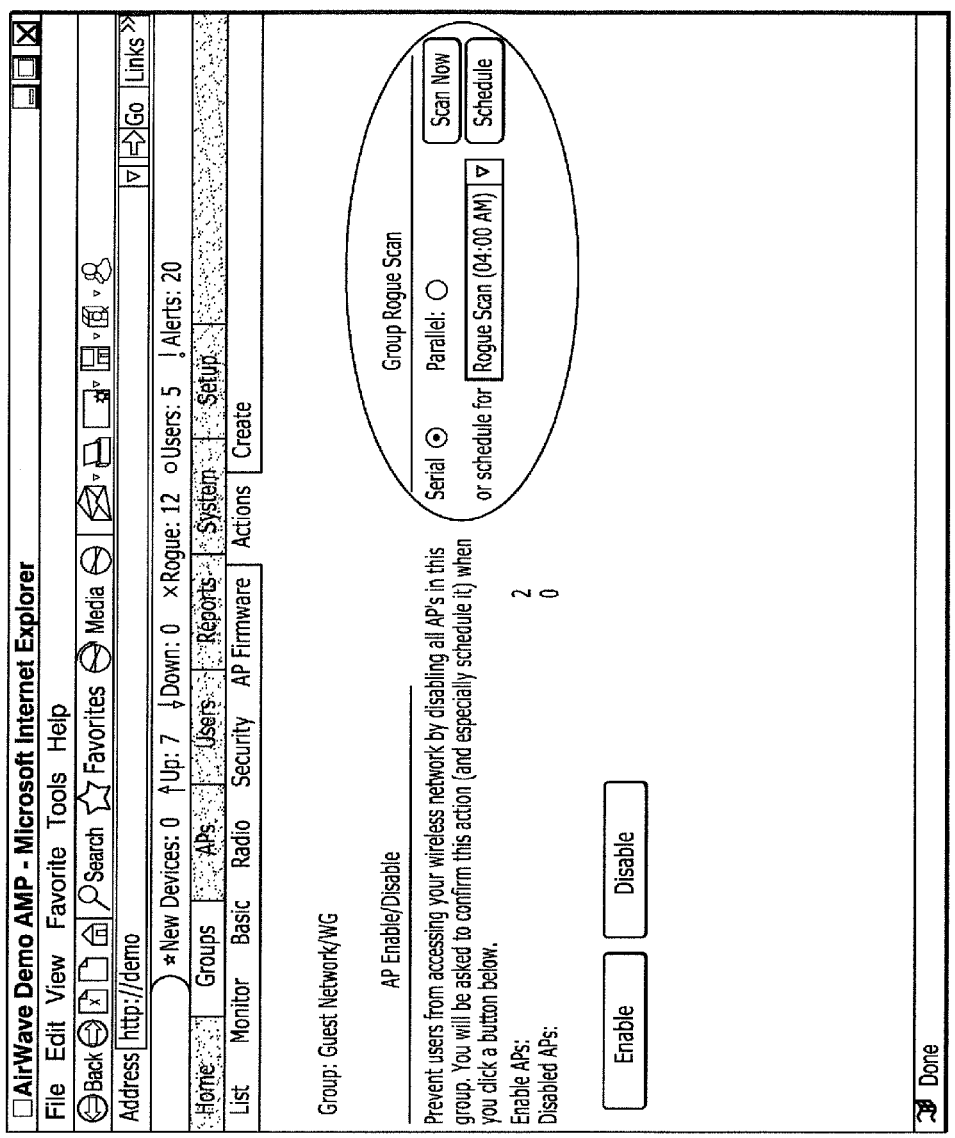
FIG. 5 illustrates a user interface allowing a network administrator to initiate a scan for rogue access points for a group of wireless access points.

As FIG. 5 illustrates, airspace management platform 56 permits the flexibility to scan immediately (on-demand) or schedule a rogue AP scan for a later time. Scheduling is a desirable feature as Rogue AP scans are obtrusive to the WLAN environment. Specifically, when a wireless access point 52 is configured to scan in RF promiscuous mode, it only listens or monitors for wireless traffic, because, given the collision avoidance mechanisms associated with the 802.11 protocols, transmitting data may prevent any incoming traffic it was trying to collect. As one skilled in the art will recognize, other wireless networking protocols may allow wireless access points to simultaneously operate in RF promiscuous mode and access point mode. Accordingly, during a scan, wireless client devices 60 are disconnected from the scanning wireless access point 52 and, therefore, have no connectivity to LAN 20. Scheduling Rogue AP scans at night or on the weekend reduces the opportunities that wireless client devices 60 experience a loss of network connectivity. As FIG. 5 illustrates, airspace management platform 56 also supports both serial and parallel methods of executing the scan within a group as to both scheduled scans and on-demand scans. Serial scanning enables a well designed wireless LAN to maintain wireless client connectivity, because only a single wireless access point 52 scans at any given time. When an access point is off-line for scanning, the wireless clients can immediately associate, without loss of connectivity, to an adjacent wireless access point 52, if any, with the same SSID or within the same ESS (Extended Service Set).

After rogue AP scanning parameters are entered, airspace management platform 56, in one embodiment, builds a job schedule. In one embodiment, all tasks are executed as jobs via the scheduler whether the job is scheduled for a later time or immediate/on-demand. In one embodiment, a task comprises a scan by a single wireless access point 52; accordingly, a requested group scan may yield a plurality of jobs in the job scheduler. In one embodiment, when the job scheduler executes a job, it constructs an SNMP SET request and transmits it to the wireless access point 52 associated with the job. For example, in embodiments where wireless access point(s) 52 support(s) the SNMP MIB set forth in Appendix A, the job scheduler executes a SNMP SET request for Object Identifier (OID) (1.3.6.1.4.12028.4.3.4 BeginRogueAPScan) which, in one embodiment, passes the following value sets: {(packetsToCollect type-integer, value), (secsToWaitPerChan type-integer, value), (channelBeginScan, type-integer, value), (channelEndScan, type-integer, value), (channelToSkip, type-integer, value), and (numberofIterations, type-integer, value)} [see Appendix A]. In one embodiment, airspace management platform 56 waits for a configurable number of seconds after the SNMP SET request to receive all device scan traps (scanDataRow) and the end of scan trap (endRogueScan) from the scanning access point 52. If no traps are received, airspace management platform 56 transmits another SNMP SET request. If no traps are received after a threshold number of SET requests, airspace management platform 56 reports a fault condition to the network administrator.

B. Scanning Wireless Airspace

After receiving the SNMP-SET request from airspace management platform 56, the wireless access point 52 invokes a locally executed scanning agent which moves its WLAN Network Interface Card (NIC) card from BSS master mode or normal AP mode, to a promiscuous RF monitoring mode. Many WLAN network interface cards installed on currently available wireless access points include promiscuous monitoring functionality, such as PrismII cards in LinkSys®, D-Link®, Compaq®, and Cisco® wireless access points. Promiscuous monitoring mode is a process that has analogy on the wired or wire line medium. On a wired network most Ethernet cards filter traffic so that only traffic destined for that card (installed in a PC or other network device) is received into higher layers of the operating system. Placing the LAN NIC card into "promiscuous mode" causes the LAN NIC to pass all traffic seen on the wire to higher layers in the operating system. On a non-switched or hub network, a computer or network device with its network card in promiscuous mode can listen to all traffic on the network segment. Similarly, in 802.11 or other wireless networks, the WLAN NIC, operating in its normal mode, only sends data packets destined for the device or management packets for Basic Service Set to higher layers in the operating system. In 802.11 wireless networks, wireless NICs, operating in a normal mode, only send packets within the same BSS and the same SSID to higher layers of the operating system. RF promiscuous mode, however, enables the wireless NIC to sniff all traffic in the surrounding airspace (radio coverage area and relative to one to a plurality of channels) regardless of network association.

Figure 6:
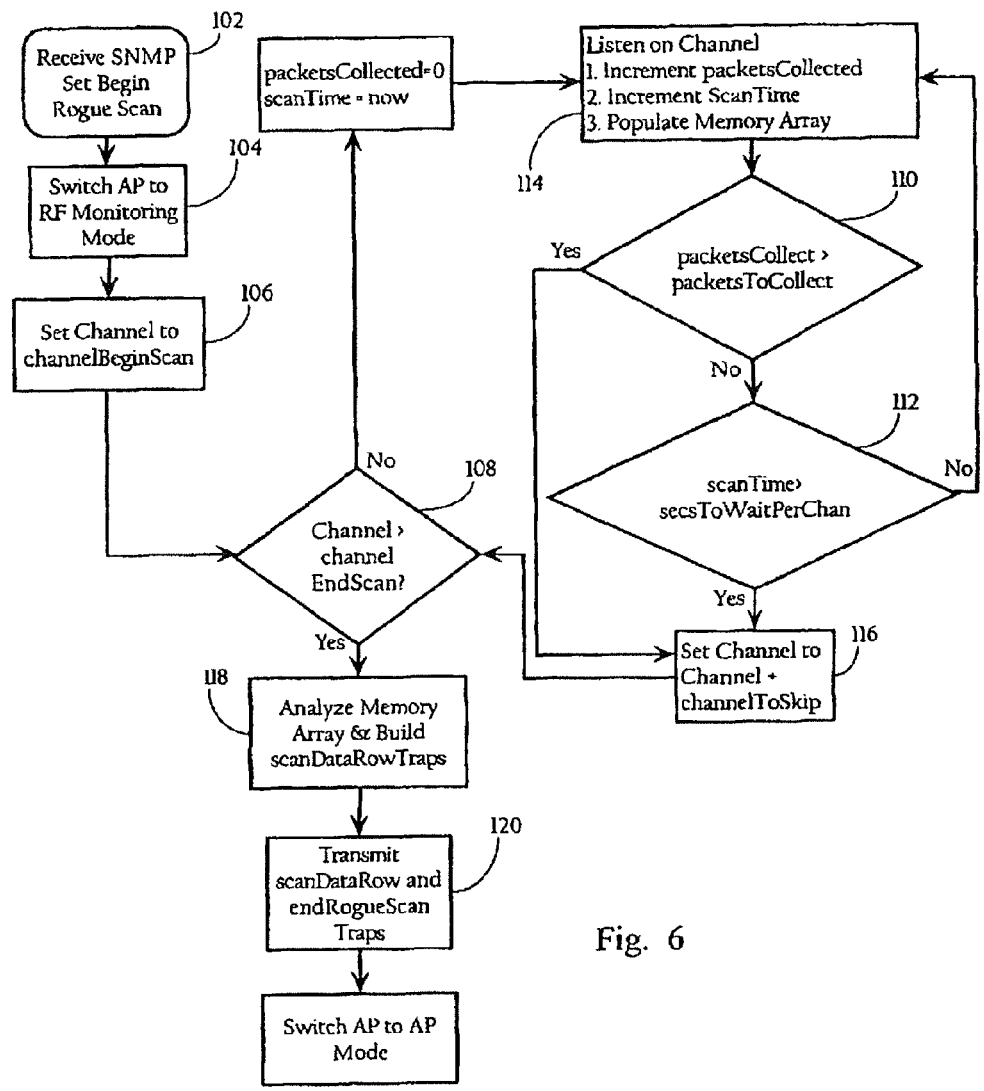
FIG. 6 is a flow chart diagram showing a method, according to one embodiment, for scanning at an access point for rogue devices.

FIG. 6 illustrates a method, according to an embodiment of the present invention, directed to scanning for rogue access points. When a designated wireless access point 52 receives an SNMP SET request (above) (102), a scanning agent changes the configuration of wireless access point 52 to operate in promiscuous RF monitoring mode (104). Once in this mode, the scanning agent executing within access point 52 uses the variables passed within the SNMP SET request to OID "beginRogueScan" to execute the properly formulated scan. Specifically, the scanning agent begins listening on the channel defined in the "channelBeginScan" variable (106). The scanning agent monitors this channel for packets and analyzes detected packets in order to build a memory array including data corresponding to detected wireless client devices and access points (114). In one embodiment, while a variety of packet types may be present, the scanning agent is configured to process only data packets and management-beacon packets to build the memory array of wireless devices, as discussed below. As FIG. 6 illustrates, the scanning agent listens on the current channel until it collects the number of packets defined in variable "packetsToCollect" (110) or until the channel timer has expired defined in variable "secsToWaitPerChan" (112). Next the scanning agent proceeds to the next channel (current channel+SNMP variable "channelToSkip") (116) until the next channel is greater than SNMP variable "channelEndScan" (108).

Figure 7A:
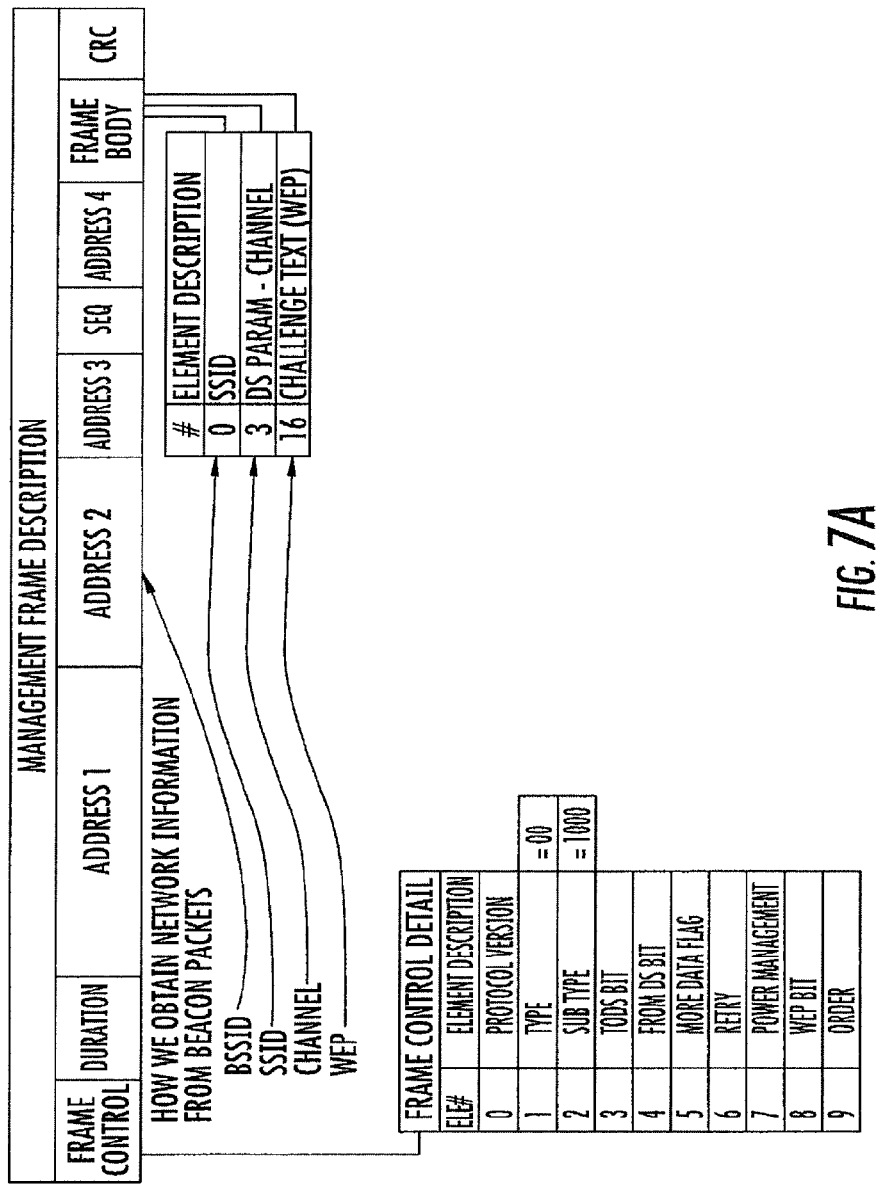
FIG. 7A illustrates the layout of management frames or packets in 802.11 networks and the mapping of information in the frames.

FIGS. 7A (management) and 7B (data) set forth the frame layout according to the 802.11 specification and illustrates how the scanning agent analyzes the data packets gathered while in the promiscuous monitoring mode to populate a memory array. FIG. 7A illustrates the frame layout of a management packet, such as a beacon packet transmitted by an access point. As FIGS. 7A and 7B illustrate, packet type (e.g., data v. beacon) in the 802.11 standard can be determined by examining the values of the frame control bits. FIG. 7A illustrates how the scanning agent can detect various fields such as BSSID, SSID, Channel and the like. Furthermore, FIG. 7B illustrates the frame layouts of data packets transmitted from (top layout) and to (bottom layout) a wireless access point. As FIG. 7B illustrates, the direction of data packets can be determined by evaluation of the values of the frame control bits. With the direction, the scanning agent can resolve whether the first address (address 1) or the second address (address 2) corresponds to the access point (BSSID). The RSSI (relative signal strength) is provided by a physical layer header called PrismII monitor header that is not a part of 802.11 frame header, but is generated by the firmware of the receiving card. One skilled in the art will recognize that other wireless protocol standards feature different frame layouts and will be able to configure the scanning agent to parse the various data fields in the packet or frame headers.

In addition, FIG. 8 illustrates a memory array (top table) including data obtained during a hypothetical scan for didactic purposes. For example, the first row of the memory array indicates that, on channel 1, the scanning access point detected a data packet transmitted from/to a wireless client (see Type field) associated with an access point having a WLAN MAC address or BSSID of 00:02:2D:03:4C:B0. Further, the second row indicates that the scanning access point also detected a data packet from the same client on channel 2. As one of skill in the art will recognize, the channels defined in the 802.11 specification only include 3 non-overlapping channels (1, 6 and 11) among the total number of channels. As one of skill in the art understands, the channel represents the center frequency that the transceiver within the radio and access point uses (e.g., 2.412 GHz for channel 1 and 2.417 GHz for channel 2). There is only 5 MHz separation between the center frequencies. Furthermore, an 802.11b signal occupies approximately 30 MHz of the frequency spectrum. The signal falls within about 15 MHz of each side of the center frequency. As a result, an 802.11b signal overlaps with several adjacent channel frequencies. This leaves only three channels (channels 1, 6, and 11 for the U.S.) that can be used without causing interference between access points. Accordingly, a scanning access point is likely to detect data packets from a given wireless client or access point on more than one channel. For example, scanning on channels 3 and 4, the scanning access point 52, in the didactic hypothetical, detected beacon packets from an access point having a MAC address of 00:02:2D:03:4C:B0 and configured with an SSID of "AirPort Network." As FIG. 8 shows, the scanning access point detected no wireless traffic on channel 8 during the scan.

As FIG. 6 further illustrates, after the scan and memory array construction, the scanning agent analyzes the memory array (118) and sends back a summarized set of traps to airspace management platform 56 (120). The table illustrated in FIG. 8 and entitled "Post Analysis Data Sent via SNMP to AMP from Scanning AP" illustrates the scanDataRow traps (each row corresponding to a trap). In one embodiment, the scanning agent resolves discrepancies such as the channels on which packets were detected in creating the scanDataRow traps. See also Appendix A ("scanDataRow"). As FIG. 8 illustrates, the scanning agent logically assigned the closest usable (non-overlapping) channel to the networks implemented by access points "00:03:2F:00:12:AE" and "00:02:2D:0D:4D:7C". Also notice the Access Point "00:02:2D:03:4C:B0" is summarized into a single trap event though it was heard on channel 3 and channel 4. Because 802.11-compliant beacon frames identify the transmitting channel, the scanning agent assumes that the channel identified in the beacon packet (here, channel 1) is correct and that the data packet detected during the scan on channel 4 bleed-over from channel 1. In the example illustrated in FIG. 8, at the end of the analysis, the scanning access point 52 would transmit to airspace management platform 56 four "scanDataRow" SNMP traps and one "endRogueAP" SNMP traps (signaling the end of the scan and indicating the number of scanDataRow traps sent).

As one skilled in the art will recognize, the scanning agent described above does not distinguish between registered/authorized wireless devices and rogue or non-registered devices. Rather, as discussed above, the data generated during the scan is summarized and sent as SNMP traps to airspace management platform 56, which processes the traps (as discussed more fully below) to detect the present of rogue access points and/or wireless clients. One skilled in the art will recognize, however, that this division of functionality is not required by any constraint, and that the scanning agent executed by the access point(s) 52 can be configured to detect for the presence of rogue access points and transmit corresponding SNMP traps to airspace management platform 56. A preferred embodiment, however, is the example described herein where the scanning agent running on the access point only collects data characterizing detected wireless traffic and transmits this collected data or summarized versions to airspace management platform 56 for further analysis. Airspace management platform 56, according to a preferred embodiment, performs the analysis of the data, functioning as the SNMP manager while the access point functions as the agent in accordance with the principal foundations of the SNMP framework.

B.1. Identification of Access Points from SNMP Trap Data

Airspace management platform 56 receives the scanDataRow traps and processes them to identify rogue wireless devices. In one embodiment, each scanDataRow trap is processed against the information contained in one to a plurality of tables to identify rogue wireless devices operating within the airspace associated with the wireless network environment. In one embodiment, airspace management platform 56 maintains three categories of wireless devices: 1) authorized, 2) rogue, and 3) ignored. Authorized wireless access points are generally business grade access points (e.g., manufactured by Cisco, Lucent, Symbol, etc.) that have been authorized by the enterprise/network administrator and registered with airspace management platform 56 (see above). As discussed above, information relating to authorized access points is contained in the AP_Master table. As discussed more fully below, airspace management platform 56, in one embodiment, also maintains a Rogue_Master table and an Ignored_Master table. An authorized wireless client or wireless station associates to an authorized access point and also possesses valid authentication credentials granted by a central security system. Rogue wireless devices encompass any wireless device (client or access point) in the enterprise's airspace that is not registered as an authorized or ignored device, as indexed by WLAN MAC address in the appropriate tables within the airspace management platform 56. The ignored category represents wireless devices that have been processed through the rogue detection process set forth herein, reported to the network administrator and configured by the administrator in the Ignored category. An example would be an access point from a neighboring business. The access point is not rogue, but is nevertheless worthy of attention and is generally ignored until a change associated with the access point is detected.

Figure 9:
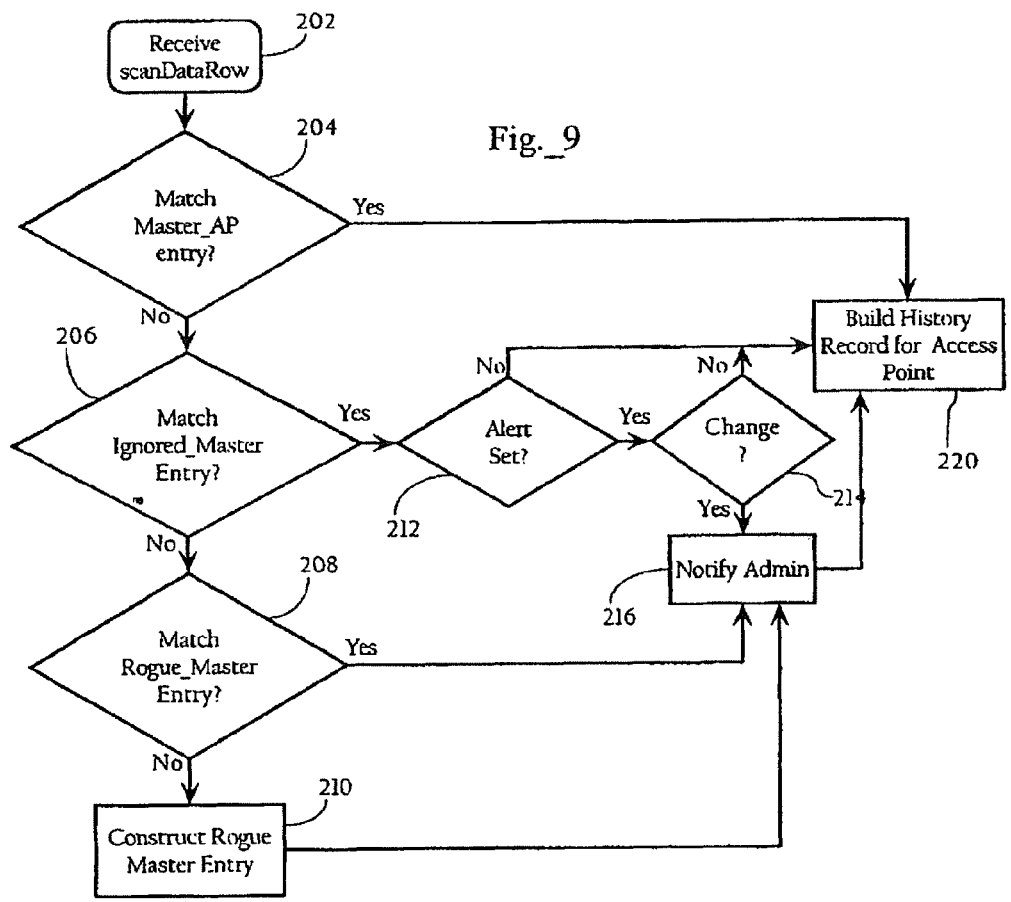
FIG. 9 is a flow chart diagram illustrating a method, according to an embodiment of the present invention, directed to the processing of SNMP traps transmitted by scanning access points.

Against this exemplary backdrop, each "scanDataRow" trap is processed in the following manner. Airspace management platform 56, in one embodiment, evaluates the "awAPReturnBSSID" against the three categories of wireless devices (authorized, ignored and rogue) in the Master, Ignored and Rogue AP tables. FIG. 9 sets forth a method for processing scanDataRow traps according to an embodiment of the present invention. In one embodiment, airspace management platform 56 first queries the AP_Master table, searching for matches between the awAPReturnBSSID and the WLAN MACs of the AP records in that table (204). If there is a match, airspace management platform 56 builds a history record for the AP (220), showing that it was scanned by the AP defined in the value "awAPScanID" or LAN MAC address.

If there is not a match between the "awAPReturnBSSID" and the WLAN MACs of the AP_Master table records, then airspace management platform 56 determines whether the "awAPReturnBSSID" matches any records contained in the Rogue_Master (208) and Ignored_Master (206) tables. If the awAPReturnBSSID matches an entry in either table, airspace management platform 56 builds a history record for the matching access point as discussed above. If there is not a match in either the Rogue_Master or IgnoredMaster tables, then the airspace management platform 56 creates a Rogue_Master record with an index using the WLAN MAC or "awAPReturnBSSID" (210). As FIG. 9 shows, airspace management platform 56 also builds a history record for the Rogue AP (220), showing that it was scanned by the AP defined in the value "awAPScanID" or the LAN MAC address.

In one embodiment, history records are maintained in a history table indexed by WLAN MAC address and further contain the remaining data elements contained in the scanDataRow trap. By building these relationships, airspace management platform 56 can analyze these history records to determine which authorized access points are contiguous, on what channel these APs are broadcasting, and the relative signal strength of their transmissions. Utilizing this information, airspace management platform 56 can automatically configure (or the network administrator can manually configure) the transmission power level and channel for optimum performance in light of the surrounding access points. For 802.11b as regulated in the United States in particular, there are only 3 non-overlapping channels (1, 6, and 11), so this high-level logic is extremely valuable and can be used to ensure that contiguous access points (those with overlapping airspaces) are configured to broadcast on non-overlapping channels. In a multi-floor environment a third dimension of height or floor level is added. Airspace management 56 seamlessly learns and links all access points by contiguous airspace by determining which access points can sense each other. As discussed above, the AP_Master record also stores the positional (e.g., GPS) coordinates associated with each wireless access point 52, allowing a true 3-dimensional depiction of a WLAN environment. Currently produced access points do not generally contain GPS receivers, accordingly, the information recorded in the database is only as accurate as a human translating the GPS reading from a handheld device at the location of the access point, and inputting the information into the database of airspace management platform 56. As one skilled in the art will recognize, the integration of GPS receivers into wireless network access points and corresponding MIB extensions to expose the GPS coordinates computed by the receiver can be readily accomplished. Accordingly, future embodiments of airspace management platform 56 also contemplate querying access points via SNMP or similar protocols for GPS coordinates. Even without GPS coordinates, airspace management platform 56 is still able to produce a 2-dimensional representation of the airspace associated with an administrative domain, mapping out contiguous access points.

B.2. Notifications

In one embodiment, an aspect of airspace management platform 56 is operative to provide notifications upon the detection of certain events (e.g., detection of a rogue access point, changes to ignored devices, changes/degradation of network performance characteristics, etc.). All data from access points, clients, security repositories, and network infrastructure is monitored on a real-time or near-real-time basis. Airspace management platform 56 further allows network administrators to define triggers when one or more collected data values exceed a threshold. Triggers cause an alert action to take place when the threshold is exceeded. Rogue access points, in one embodiment, fall under the security category. In one embodiment, there is a specific system trigger entitled "New Rogue AP Discovered" where a network administrator can define how he/she wants to receive immediate communication about the presence of a rogue device in the airspace. The three avenues for communication, in one embodiment, are email (address or distribution list), log(message is written into a syslog), and NMS (a trap is sent to a Network Management System like HP OpenView).

FIG. 9 illustrates that, in one embodiment, airspace management platform 56 issues a notification in response to the detection of rogue access points and/or changes to ignored access points. As described above, wireless devices discovered during a wireless scan of the airspace are categorized depending on airspace management platform 56 system settings (e.g., the state of the AP_Master and other tables) as Authorized, Ignored or Rogue. Specifically, as FIG. 9 shows, when airspace management platform 56 categorizes a wireless device as a rogue device (208,210), it issues a notification (216). Similarly, detected changes to an Ignored device (214) can also cause airspace management platform 56 to issue a notification. In one embodiment, the ignored_Master table contains a flag "AlertOnChange". If this flag is set (212), airspace management platform 56, in one embodiment, compares the channel, SSID, and WEP of the Ignored access point in the Ignored Master Table to the information received in the scanDataRow trap.

The Ignored device category, in one embodiment, can be used for access points that are not rogue access points connected to an enterprise's local area computer network, but for those access points that nevertheless overlap with the airspace associated with the enterprise's administrative domain. For example, this could be a legitimate, physically-adjacent enterprise's access point beyond the network administrator's control, but still worthy of monitoring. For example, the network administrator having knowledge of such an access point can engineer his network so that the access points 52 that overlap the airspace with the neighboring access point are operating on a different channel and SSID. The "AlertOn-Change" flag, in one embodiment, indicates to airspace management platform 56 only to notify the network administrator when this Ignored device changes channel, SSID, or location, as these settings and the access point's location could impact the performance of the enterprise's wireless network. When the "AlertOnChange" flag is set airspace management platform 56 looks at the trigger definition of "Ignored AP Alert on Change" and sends the appropriate notifications. As one skilled in the art will recognize, the detection of a new/unknown wireless device, according to the embodiments described above, will never directly create an entry into the Ignored_Master table. Rather, as FIG. 9 illustrates, the detection of an unknown wireless device creates a new entry into the Rogue_Master table and is reported to a network administrator. The network administrator can then decide whether to place the discovered wireless device in the Ignored category and, therefore, the Ignored_Master table.

In one embodiment, airspace management platform 56 allows network administrators to configure a "New Rogue AP Discovered" trigger defining how notifications are issued. Depending on the definition of "New Rogue AP Discovered" trigger, airspace management platform 56, in one embodiment, creates a notification or notifications containing the following information: 1) LAN MAC and AP Name of discovering access point, 2) date and time the scan was initiated, 3) the duration of the scan, 4) the WLAN MAC of the Rogue device, 5) the SSID of the WLAN device, 6) the channel of the Rogue device, and 7) potentially the Client Radio MAC address. Included in each of these notifications, according to one embodiment, are URL links back to the Rogue Event, Discovering access point, and Rogue device. The URL link enables recipient network administrators immediate access over a computer network to resolve the rogue problem. FIG. 11 illustrates a user interface, according to an embodiment of the present invention, detailing the information characterizing a detected rogue access point.

C. Isolation of Rogue Access Points

Once the scan or scans are complete and all scanDataRow traps are processed, airspace management platform 56 is operative to display information characterizing the state of the enterprise's airspace. FIG. 10 shows a user interface displaying a list of rogue devices detected during a scan. This page allows WLAN administrators to view all Rogue access points discovered in the scan and take appropriate action with respect to them. As FIG. 10 illustrates, airspace management platform 56, in one embodiment, summarizes the rogue device information and sorts them by discovered date and time. From this interface, a network administrator can identify the number of rogue devices in the airspace that require further attention. In one embodiment, airspace management platform 56 includes an OUI database, which is an Organizationally Unique Identifier or a 24 bit globally unique assigned number from IEEE. This database allows airspace management platform 56 to match the first three octets of the Rogue WLAN MAC address back to the original manufacturer. In one embodiment, airspace management platform 56 includes an extended OUI database that incorporates model numbers to the $4^{th}$ and $5^{th}$ octets and cross referenced wireless manufacturer OUIs to their resale entities. As FIG. 10 shows, additional columns from this view include AP Name, SSID, Channel, WEP, RSSI, Discovery Date and Time, and Discovery Agent or AP. As FIG. 10 shows, the AP Name is blank unless and until the network administrator configures a name for it.

The SSID column allows the network administrator to quickly ensure that the detected rogue access point is not conflicting with a SSID of an authorized access point within the airspace associated with the enterprise's wireless LAN as it could hijack legitimate users associated with the conflicting authorized access point. The channel field is self explanatory, but plays an additional role in the Rogue Detail View. The WEP column allows an administrator to determine how large a security breach the access point really is. If WEP is disabled then the access point could potentially be bridging the enterprise LAN to any person within the access point's radio coverage cell. The Relative Signal Strength (RSSI) column represents the signal strength identified from the discovering access point to the rogue device.

FIG. 11 sets forth a user interface providing a detailed view of information relating to a given rogue access point detected during the scan. To continue the process of examining the rogue device, an administrator may drill into the detail view by double clicking the MAC or the AP Name in the interface of FIG. 10. If the AP Name is not known it will display "Unknown". The user interface provides a network administrator the opportunity to name the detected device. The table has indexes on the WLAN MAC and the LAN MAC of the rogue device so duplicate or blank AP names do not breach the integrity of the database. In the detail view the administrator has the ability to update the AP Name, GPS coordinates, and notes regarding the access point. The first pass at this view can be utilized to find all access points that were detected within the airspace(s) of the scanning access point(s) 52. Either utilizing GPS or basic triangulation a network administrator with the information provided by airspace management platform 56 has a good estimate of the location of the rogue access point. The relative signal strength indicator value adds some granularity to the potential location of the device as a small RSSI value relative to one scanning access point indicates that it may be further away, while a RSSI value indicates that it may be closer to the scanning access point.

The administrator now can proceed to the approximate location of the detected rogue access point with a GPS Receiver and wireless scanning tool. When the access point is located, the network administrator can physically disable the access point (for access points located on the wired network), note location (for access points not connected to the wired network), or take any other appropriate action. Using the airspace management platform 56, the network administrator can update as much information gathered about the rogue access point by assigning a Name and notes about whom and how the access point was installed. For example, the rogue device could be an access point from a neighboring business. In this instance the name and notes fields would reflect this information. After updating the data, the network administrator can delete the record corresponding to the rogue access point, leave it in the rogue category, or place it in the authorized category (if rogue detection is being used to discover new and authorized devices) or the ignored category. Ignoring or deleting the rogue device completes the isolation process work flow for the selected rogue device. The administrator can then continue working on analyzing the remaining devices on the list until all rogue devices are isolated.

The following provides a didactic example illustrating application of the present invention. One example of this scenario would be where a first business installs a wireless network at a remote facility. Subsequently, an adjacent entity decides to install a WLAN in its small office. This access point is not a rogue as it is not installed on the enterprise's network, but the enterprise would nevertheless want to know about it. The first time a Rogue Scan is run on the access point for that particular remote facility, the discovered access point associated with the adjacent business would be detected and Recorded as a rogue device. The network administrator would be very interested in determining whether the rogue device runs on the same or overlapping frequency channels of authorized access points that detected the rogue device during the scan. This would aid the administrator in adjusting the configuration of, and optimizing the performance of, the enterprise's wireless network. The network administrator would also want to ensure that the adjacent access point is not configured with the same SSID. The network administrator may also desire to know whether WEP was enabled on the adjacent access point as any wireless client may associate to the rogue access point that does not have WEP enabled instead of the desired enterprise access point. Using airspace management platform 56, the network administrator could quickly run a report to show usage patterns for the days preceding detection of the rogue device. If the number of users and wireless traffic has declined significantly, then the network administrator could travel to the remote location to determine the best means of resolution. If the user and traffic numbers have not declined, the network administrator could simply move the detected access point to the ignored classification with "alert on change" set. As the example illustrates, the present invention reduces the cost of monitoring the WLAN by (1) minimizing the time and resources required to roam throughout the enterprise with a laptop sniffing for rogue access points and users, by (2) allowing an enterprise to leverage a single device, or multiple devices, to function as an access point and air scanner, and (3) by centrally managing all access points from a single console.

Although the present invention has been described as operating in connection with wireless devices employing the 802.11b protocol, the present invention has application in a variety of computer network environments employing any suitable wireless physical and link layer protocols, such as 802.11a, 802.11b, 802.11g, MAC layer protocols 802.11d 802.11e 802.11h and 802.11i, and Radio Bands 2.4 GHz and 5 GHz. Further, although embodiments of the present invention have been described as operating in connection with SNMP, any suitable protocols can be used. In addition, although embodiments of the present invention have been described as operating in connection with a local area network, the present invention can be deployed across other computer networks, such as the Internet or other wide area networks.

Accordingly, the present invention has been described with reference to specific embodiments. Other embodiments of the present invention will be apparent to one of ordinary skill in the art. It is, therefore, intended that the claims set forth below not be limited to the embodiments described above.

APPENDIX A-MIB

```
//
//****************************************************************
// MIB Definition
// * SNMP Set request from AMP to AP that support AW MIB for Rogues
// * (1.3.6.1.4.12028.4.3(awAPMIB).4(beginRogueScan Set Request)
//
//****************************************************************
beginRogueScan   OBJECT IDENTIFIER ::={ awAPMIB 4}
```

APPENDIX A-MIB-continued

```
packetsToCollect OBJECT-TYPE
    SYNTAX      Integer
    MAX-ACCESS         read-write
    STATUS      current
    DESCRIPTION
        "The number of 802.11 packets to collect prior to moving channels"
    ::= { beginRogueScan 1}
secsToWaitPerChan OBJECT-TYPE
    SYNTAX      Integer
    MAX-ACCESS         read-write
    STATUS      current
DESCRIPTION
        "The number of seconds to listen on each channel"
    ::= { beginRogueScan 2 }
channelBeginScan OBJECT-TYPE
    SYNTAX      Integer
    MAX-ACCESS         read-write
    STATUS      current
    DESCRIPTION
        "Starting Channel for scan"
    ::= { beginRogueScan 3 }
channelEndScan OBJECT-TYPE
    SYNTAX      Integer
        MAX-ACCESS           read-write
    STATUS      current
    DESCRIPTION
        "Ending Channel for scan"
    ::= { beginRogueScan 4 }
channelToSkip OBJECT-TYPE
    SYNTAX      Integer
    MAX-ACCESS         read-write
    STATUS      current
DESCRIPTION
    The number of channel to skip for each scan. 5 would
    get 1,6,11 for 802.11b in US"
    ::= { beginRogueScan 5 }
numberOfIterations
    SYNTAX      Integer
    MAX-ACCESS         read-write
    STATUS      current
    DESCRIPTION
        "The number of iterations - meaning the AP would start
        @ channelBeginScan listening for packetsToCollect or
        secsToWaitPerChan and loop until channelEndScan for
        numberOfIterations iterations. The default value is
        1,99 will cause the AP to full time scan until next
        beginRogueScan is received "
    ::= { beginRogueScan 6 }
//
//****************************************************************
// +Rogue AP Data Traps generate by the AP and sent back to the AMP
//* //+* (1.3.6.1.4.12028.4.3(awAPMIB).5(per row of data found)
//
//****************************************************************
// -- scanDataAP        OBJECT IDENTIFIER ::={ awAPMIB 5 }
awAPScanID OBJECT-TYPE
    SYNTAX      MacAddress
    MAX-ACCESS         read-only
    STATUS      current
    DESCRIPTION
        "The LAN MAC Address of the AP Performing the SCAN"
    ::= { scanDataAP 2}
awAPReturnBSSID OBJECT-TYPE
    SYNTAX      MacAddress
    MAX-ACCESS         read-only
    STATUS      current
    DESCRIPTION
        "The BSSID or Radio MAC of the Access Point discovered.
Only present on APs"
    ::= { scanDataAP 3 }
awAPReturnSSID OBJECT-TYPE
    SYNTAX      DisplayString
    MAX-ACCESS         read-only
    STATUS      current
    DESCRIPTION
        "The SSID of the Access Point discovered."
    ::={ scanDataAP 4 }
awAPReturnChannel OBJECT-TYPE
    SYNTAX      INTEGER
    MAX-ACCESS         read-only
```

APPENDIX A-MIB-continued

```
        STATUS      current
        DESCRIPTION
            "The Channel contained only in Beacon Packets.
            Program could guess by data packets collected
            on Channels 5,6, & 7 one could surmise that
            the client is on channel 6."
    ::= { scanDataAP 5 }
awAPReturnWEPOn OBJECT-TYPE
        SYNTAX      INTEGER {(1) False, (2) True]
        MAX-ACCESS      read-only STATUS       current
        DESCRIPTION
            "1 indicates WEP is & 2 indicates WEP is on"
    ::={ scanDataAP 6 }
awAPReturnType OBJECT-TYPE
        SYNTAX      INTEGER {(1) AP,(2) Client,(3) Adhoc, (4) Bridge
                        }
        MAX-ACCESS      read-only
        STATUS      current
        DESCRIPTION
            "Type of device picked up on scan"
    ::={ scanDataAP 7}
awAPReturnRSSI OBJECT-TYPE
        SYNTAX      INTEGER
        MAX-ACCESS      read-only
        STATUS      current
        DESCRIPTION
            "Relative Signal Strength"
    ::- { scanDataAP 8 ]
awAPReturnClMAC OBJECT-TYPE
        SYNTAX      MacAddress
        MAX-ACCESS      read-only
        STATUS      current
        DESCRIPTION
            "MAC address of client wireless NIC - only valid for
            client devices."
    ::= { scanDataAP 9 }
scanDataRow NOTIFICATION-TYPE
    OBJECTS { awAPScanId, awAPReturnBSSID,
        awAPReturnSSID,
            awAPReturnChannel,
            awAPReturnWepOn,
        awAPReturnType,
        awAPReturnRSSI
        awAPReturnClMAC}
    STATUS current
    DESCRIPTION
        "This trap is sent for AP and client observed in the BSA."
    ::= { scanDataAP 1}
//
//****************************************************************
//* SNMP trap from AP to AMP
//* (1.3.6.1.4.12028.4.3(awAPMIB).6(endRogueScan Set Request)
//
//****************************************************************
//endRogueScan      OBJECT IDENTIFIER::- { awAPMIB 6 ]
awAPScanDuration OBJECT-TYPE
        SYNTAX      INTEGER
        MAX-ACCESS      read-only
        STATUS      current
        DESCRIPTION
            "Total duration of scan in seconds"
    ::= { endRogueDuration 2 }
awAPTotTraps OBJECT-TYPE
        SYNTAX      INTEGER
        MAX-ACCESS      read-only
        STATUS      current
        DESCRIPTION
            "Total traps(devices) sent to the AMP"
    ::= { endRogueDuration 3 }
endRogueScan NOTIFICATION-TYPE
    OBJECTS { awAPScanId,
        awAPScanDuration,
        awAPScanTotTraps]
    STATUS      current
    DESCRIPTION
        "This trap is sent for AP and client observed in the BSA."
    ::= { endRogueScan 1}
```

What is claimed is:

1. A non-transitory computer readable medium comprising instructions which, when executed by one or more hardware processors, causes the one or more hard processors to:
   operate a particular network device in a first mode, wherein in the first mode, the particular network device is to communicate wirelessly with at least one wireless client device to provide the at least one wireless client device access to one or more resources, receive packets transmitted by the at least one wireless client device and forward the packets to the one or more resources;
   switch the particular network device from operating in the first mode to operating in a second mode; and
   operate the particular network device in the second mode, wherein in the second mode, the particular network device is to (a) identify a second network device within a radio frequency range from the particular network device based on the particular network device monitoring data packets transmitted by the second network device to one of the network devices other than the particular network device and (b) report information related to the second network device.

2. The non-transitory computer readable medium of claim 1, wherein the particular network device does not provide access to the one or more resources to any wireless client device while operating in the second mode.

3. The non-transitory computer readable medium of claim 1, wherein in the second mode, the particular network device is to receive a first portion of the data packets on a first radio frequency channel and a second portion of the data packets on a second radio frequency channel that is different than the first radio frequency channel.

4. The non-transitory computer readable medium of claim 1, wherein in the second mode, the particular network device is to identify and report at least one network device that is (a) operating within a radio frequency range from the particular network device and (b) not addressing any data packets to the particular network device.

5. A particular network device comprising:
   at least one hardware processor; and
   a non-transitory computer readable storing instructions that when executed by the at least one hardware processor cause the at least one hardware processor to:
      operate in a first mode, wherein in the first mode, the at least one hardware processor is to communicate wirelessly with at least one wireless client device to provide the at least one wireless client device access to one or more resources, receive packets transmitted by the at least one wireless client device and forward the packets to the one or more resources;
      switch from operating in the first mode to operating in a second mode; and
      operate operating in the second mode, wherein in the second mode, the at least one hardware processor is to (a) identify a second network device within a radio frequency range from the particular network device based on the particular network device monitoring data packets transmitted by the second network device to one of the network devices other than the particular network device and (b) report information related to the second network device.

6. The particular network device of claim 5, wherein the at least one hardware processor does not provide access to the one or more resources to any wireless client device while operating in the second mode.

7. The particular network device of claim 5, wherein, in the second mode, the at least one hardware processor is to receive a first portion of the data packets on a first radio frequency channel and a second portion of the data packets on a second radio frequency channel that is different than the first radio frequency channel.

8. The particular network device of claim 5, wherein in the second mode, the at least one hardware processor is to identify and report at least one network device that is (a) operating within a radio frequency range from the particular network device and (b) not addressing any data packets to the particular network device.

9. A non-transitory computer readable medium comprising instructions which, when executed by one or more hardware processors, cause the one or more hardware processors to:
   operate a particular network device in a first mode, wherein in the first mode, the particular network device is to communicate wirelessly with at least one wireless client device to provide the at least one wireless client device access to one or more resources, receive packets transmitted by the at least one wireless client device and forward the packets to the one or more resources;
   switch the particular network device from operating in the first mode to operating in a monitoring mode; and
   operate the particular network device in the monitoring mode, wherein in the monitoring mode, the particular network device is to monitor packets on a plurality of radio frequency channels and report information associated with the packets detected on the plurality of radio frequency channels, and
   wherein in the monitoring mode, the particular network device is to (a) identify a second network device within a radio frequency range from the particular network device based on the particular network device monitoring data packets transmitted by the second network device to one of the network devices other than the particular network device and (b) report information related to the second network device.

10. The non-transitory computer readable medium of claim 9, wherein the particular network device does not provide access to the one or more resources to any wireless client device while operating in the monitoring mode.

11. The non-transitory computer readable medium of claim 9, wherein operating in the monitoring mode comprises decoding data packets not addressed to the particular network device.

12. The non-transitory computer readable medium of claim 9, wherein in the monitoring mode, the one or more hardware processors are further to identify and report at least one network device that is (a) operating within a radio frequency range from the particular network device and (b) not addressing any data packets to the particular network device.

13. A method comprising:
   operating a particular network device in a first mode, including communicating wirelessly with at least one wireless client device to provide the at least one wireless client device access to one or more resources, receiving packets transmitted by the at least one wireless client device and forwarding the packets to the one or more resources;
   switching the particular network device from operating in the first mode to operating in a second mode; and
   operating the particular network device in the second mode, including the particular network device identifying a second network device within a radio frequency range from the particular network device based on the particular network device monitoring data packets transmitted by the second network device to one of the network devices other than the particular network device and reporting information related to the second network device.

14. The method of claim 13, further comprising:
   preventing, by the particular network device, any wireless client device from accessing the one or more resources while the particular network device is operating in the second mode.

15. The method of claim 13, further comprising:
   in the second mode, receiving, by the particular network device, a first portion of the data packets on a first radio frequency channel and a second portion of the data packets on a second radio frequency channel that is different than the first radio frequency channel.

16. The method of claim 13, further comprising:
   in the second mode, identifying and reporting, by the particular network device, at least one network device that is (a) operating within a radio frequency range from the particular network device and (b) not addressing any data packets to the particular network device.

* * * * *